US011881070B2

(12) United States Patent
Hong et al.

(10) Patent No.: US 11,881,070 B2
(45) Date of Patent: Jan. 23, 2024

(54) CASH BOX AND CASH RECYCLING AND HANDLING DEVICE

(71) Applicant: SHANDONG NEW BEIYANG INFORMATION TECHNOLOGY CO., LTD., Shandong (CN)

(72) Inventors: Zhefeng Hong, Shandong (CN); Lei Zheng, Shandong (CN); Yong Yuan, Shandong (CN); Jianyu Sun, Shandong (CN); Qiangzi Cong, Shandong (CN)

(73) Assignee: SHANDONG NEW BEIYANG INFORMATION TECHNOLOGY CO., LTD., Shandong (CN)

( * ) Notice: Subject to any disclaimer, the term of this patent is extended or adjusted under 35 U.S.C. 154(b) by 794 days.

(21) Appl. No.: 16/977,925

(22) PCT Filed: Mar. 12, 2019

(86) PCT No.: PCT/CN2019/077760
§ 371 (c)(1),
(2) Date: Sep. 3, 2020

(87) PCT Pub. No.: WO2019/174564
PCT Pub. Date: Sep. 19, 2019

(65) Prior Publication Data

US 2020/0410802 A1 Dec. 31, 2020

(30) Foreign Application Priority Data

Mar. 13, 2018 (CN) ......................... 201810206515.5

(51) Int. Cl.
*G07D 11/12* (2019.01)

(52) U.S. Cl.
CPC .................................... *G07D 11/12* (2019.01)

(58) Field of Classification Search
CPC ...... G07D 11/12; G07D 11/10; G07D 11/125; G07D 11/13; G07D 11/16
(Continued)

(56) References Cited

U.S. PATENT DOCUMENTS 4,798,316 A * 1/1989 Martin ..................... B65H 1/12 232/1 D
5,630,631 A 5/1997 Iwamoto et al.
(Continued)

FOREIGN PATENT DOCUMENTS

CN 101076836 A 11/2007
CN 201600737 U 10/2010
(Continued)

OTHER PUBLICATIONS

Indian Office Action received from the Intellectual Property Office in India corresponding to International Application No. 202027037923 dated May 25, 2021, pp. 1-5.
(Continued)

*Primary Examiner* — William L Miller
(74) *Attorney, Agent, or Firm* — George Likourezos; Carter, DeLuca & Farrell LLP

(57) ABSTRACT

Provided are a cash box and a cash recycling and handling device. The cash box comprises a box body, a supporting plate and a self-locking assembly, where the self-locking assembly includes a stop plate disposed between a side wall of the box body and the supporting plate, and the stop plate is movably connected to the box body and has a lifted position and a lowered position; in a case where the stop plate is in the lifted position, the stop plate is in fit with the supporting plate to lock a position of the supporting plate; and in a case where the stop plate is in the lowered position, the stop plate is separated from the supporting plate to unlock the position of the supporting plate. The cash recycling and handling device includes at least one above-mentioned cash box.

17 Claims, 9 Drawing Sheets

(58) Field of Classification Search
USPC ........................................................ 232/15–16
See application file for complete search history.

(56) References Cited

U.S. PATENT DOCUMENTS

| | | | | |
|---|---|---|---|---|
| 6,622,911 | B1 * | 9/2003 | Holland-Letz | G07D 11/22 902/8 |
| 8,196,920 | B2 * | 6/2012 | Deas | G07D 11/13 271/145 |
| 9,371,203 | B2 * | 6/2016 | Go | B65H 1/022 |
| 11,263,874 | B1 * | 3/2022 | Armentrout | G07F 19/203 |
| 2010/0156035 | A1 * | 6/2010 | Deas | G07D 11/12 271/147 |
| 2013/0026178 | A1 * | 1/2013 | Peters | G07D 11/13 221/279 |
| 2015/0248802 | A1 * | 9/2015 | Go | G07D 11/125 232/1 D |
| 2015/0251861 | A1 * | 9/2015 | Go | G07D 11/12 271/160 |
| 2015/0348352 | A1 * | 12/2015 | Go | G07D 11/13 194/350 |

FOREIGN PATENT DOCUMENTS

| | | | | |
|---|---|---|---|---|
| CN | 201725381 | U | | 1/2011 |
| CN | 101806180 | B | | 7/2012 |
| CN | 104103125 | A | | 10/2014 |
| CN | 205608906 | U | | 9/2016 |
| CN | 106327398 | A | | 1/2017 |
| CN | 106780986 | A | * | 5/2017 |
| CN | 107481402 | A | | 12/2017 |
| CN | 107492190 | A | | 12/2017 |
| CN | 206833569 | U | | 1/2018 |
| CN | 206858908 | U | | 1/2018 |
| EP | 0266908 | A1 | | 5/1988 |
| KR | 20110079345 | A | | 7/2011 |

OTHER PUBLICATIONS

Chinese Office Action issued by the State Intellectual Property Office of People's Republic of China corresponding to International Application No. 201810206515.5 dated Dec. 24, 2020.

International Search Report issued by the State Intellectual Property Office of the P.R. China in connection with International Application No. PCT/CN2019/077760 dated Jun. 11, 2019.

* cited by examiner

CASH BOX AND CASH RECYCLING AND HANDLING DEVICE

The present disclosure claims priority to Chinese Patent Application No. 201810206515.5 filed on Mar. 13, 2018, the disclosure of which is incorporated herein by reference in its entirety.

TECHNICAL FIELD

The present disclosure relates to the technical field of financial self-service apparatuses, for example, relates to a cash box and a cash recycling and handling device.

BACKGROUND

Cash recycling and handling device is a kind of financial self-service apparatus which combines the functions of cash recycling, depositing, withdrawing, temporary storage, clearing, counting, counterfeit money identifying, serial number recording, continuous and uninterrupted cash input, daily cash keeping, inquiry and so on. With the cash recycling and handling device, recycling of various denominations of banknotes circulating in China can also be achieved.

A cash recycling and handling device usually includes a plurality of cash boxes to store and dispense banknotes. Firstly a cash box is usually loaded with banknotes by specific people of the bank and then the cash box loaded with banknotes is placed into the cash recycling and handling device for banknote dispensing, or when the cash box is full, the cash box is removed from the cash recycling and handling device and emptied by the specific people of the bank so that the cash box can store banknotes.

However, in the related art, if the cash box loaded with banknotes vibrates on impact or falls off unexpectedly while being transported, an unfavorable situation may occur that the supporting plate inside the cash box is very likely to shake and even move in the direction away from a separating assembly, so that the operational reliability of the cash box is greatly reduced. Moreover, in an extreme case of the supporting plate moving, banknotes located between the supporting plate and the separating assembly will change from a compacted state to a loose state, and even become disordered due to turnover. The cash box with disordered stacked banknotes in the cash recycling and handling device will make the cash recycling and handling device unable to perform normal operations of cash output and cash input. An error of the device will thus be reported and normal operation of the cash recycling and handling device will then be affected.

SUMMARY

The present disclosure provides a cash box, so as to solve the problem that the supporting plate shakes when the cash box is subjected to impact or vibrates.

The present disclosure provides a cash box. The cash box includes a box body, a supporting plate arranged in the box body and a self-locking assembly configured to prevent the supporting plate from moving in a banknotes stacking direction.

The self-locking assembly includes a stop plate disposed between a side wall of the box body and the supporting plate. The stop plate is movably connected to the box body and has a lifted position and a lowered position.

In a case where the stop plate is in the lifted position, the stop plate is in fit with the supporting plate to lock a position of the supporting plate.

In a case where the stop plate is in the lowered position, the stop plate is separated from the supporting plate to unlock of the position of the supporting plate.

The present disclosure provides a cash recycling and handling device, so as to solve the problem that the supporting plate shakes when the cash box is subjected to impact or vibrates.

The cash recycling and handling device provided by this present disclosure includes at least one cash box described above.

Figure 1:
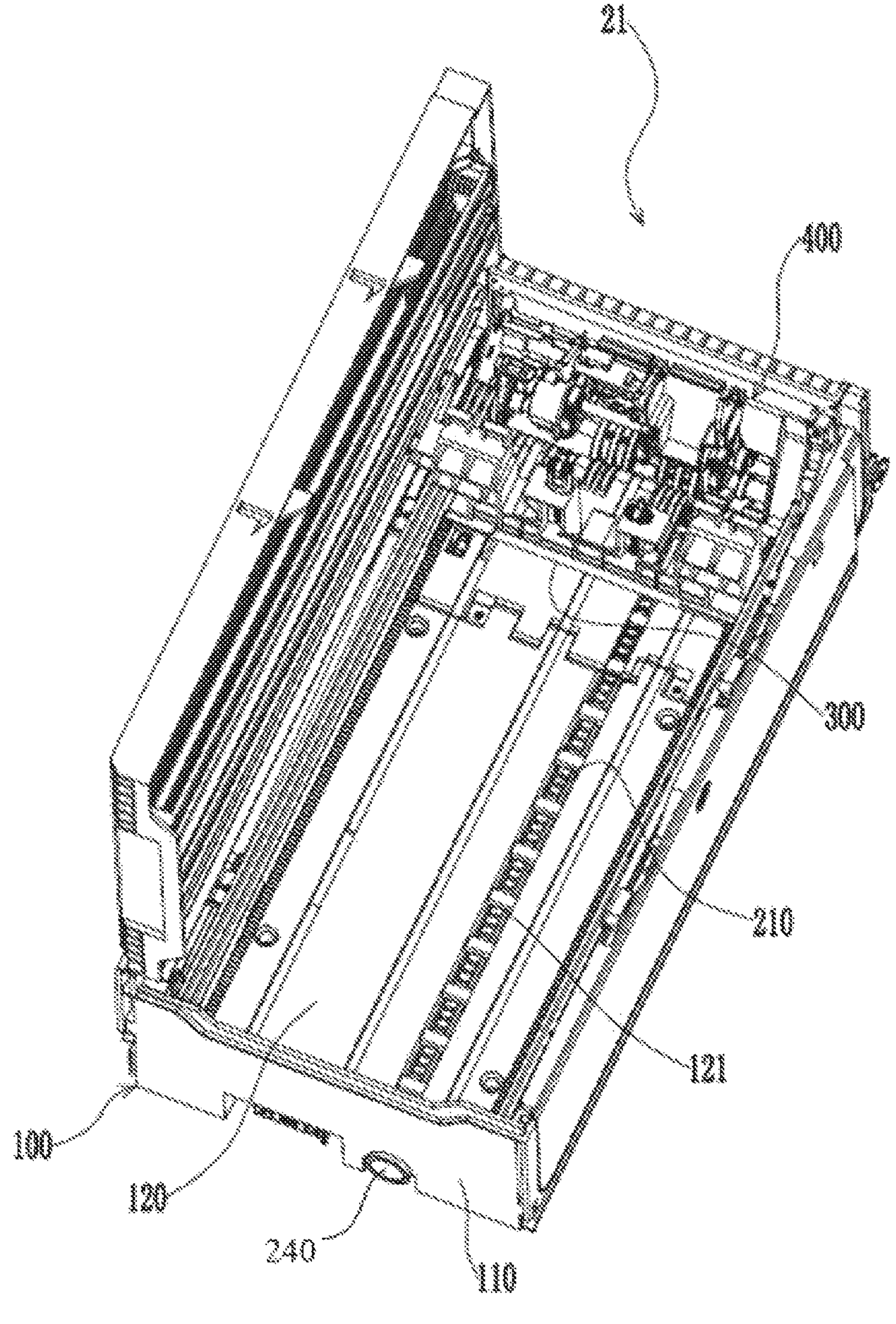
FIG. 1 is a schematic structural view of a cash box with a cover open according to an embodiment provided by the present disclosure.

In the drawings: 100—box body; 200—self-locking assembly; 300—supporting plate; 400—separating assembly; 500—supporting plate driving mechanism; 110—bottom plate; 120—datum plate; 130—side wall; 121—opening; 210—stop plate; 220—spring; 230—connecting part; 240—elastic button; 211—recess; 212—retracting slot; 213—guiding surface; 214—second inclined surface; 215—second blocking surface; 216—fourth inclined surface; 241—third inclined surface; 310—engaging part; 311—first inclined surface; 312—first blocking surface; 510—first pulley; 520—belt; 25—frame; 251—accommodating cavity; 252—boss; 10—temporary storage mechanism; 20—safe; 30—banknote input mechanism; 40—banknote output mechanism; 50—identification mechanism; 60—banknote conveying mechanism; 21—cash box.

DETAILED DESCRIPTION

Technical solutions of the present disclosure will be described below with reference to the drawings.

In the description of the present disclosure, it should be understood that the orientational or positional relationships indicated by terms "above", "below", "perpendicular" and the like are based on the orientational or positional relationships illustrated in the drawings, which are for the mere purpose of facilitating and simplifying the description of the present disclosure, and these relationships do not indicate or imply that the device or element referred to has a specific orientation and is constructed and operated in a specific orientation, and thus it is not to be construed as limiting the present disclosure. In addition, terms such as “first”, “second”, “third” and “fourth” are used merely for the purpose of description and are not to be construed as indicating or implying relative importance.

In the description of the present disclosure, unless otherwise expressly specified and limited, the term “connection” is to be construed in a broad sense, for example, may be construed as a fixed connection, a detachable connection, or an integral connection; a direct connection or an indirect connection through an intermediate medium; or a connection between interiors of two elements. For those of ordinary skill in the art, specific meanings of the preceding terms in the present disclosure may be understood based on specific situations.

Figure 2:
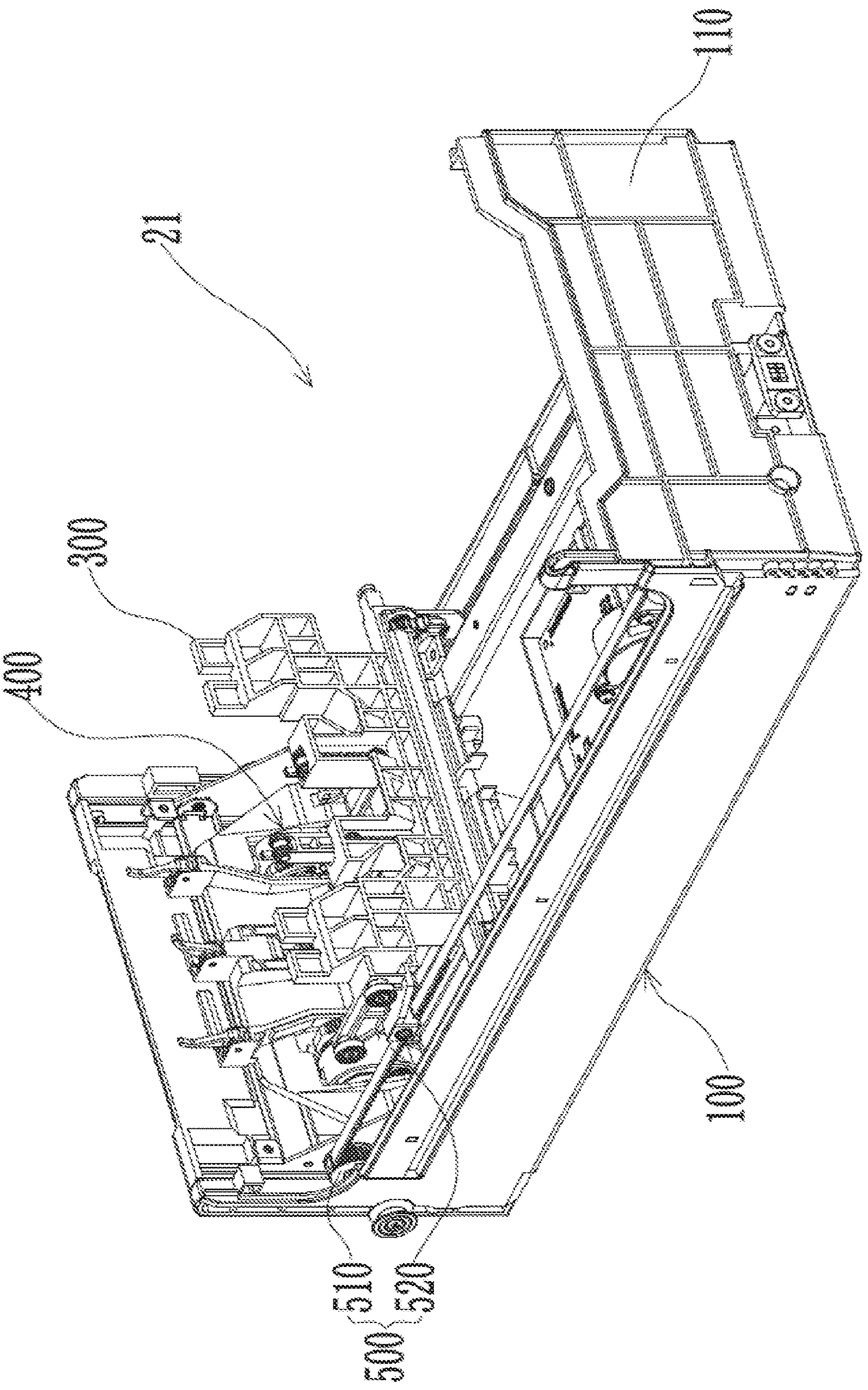
FIG. 2 is a schematic structural view of an internal structure of a cash box according to an embodiment provided by the present disclosure.
Figure 3:
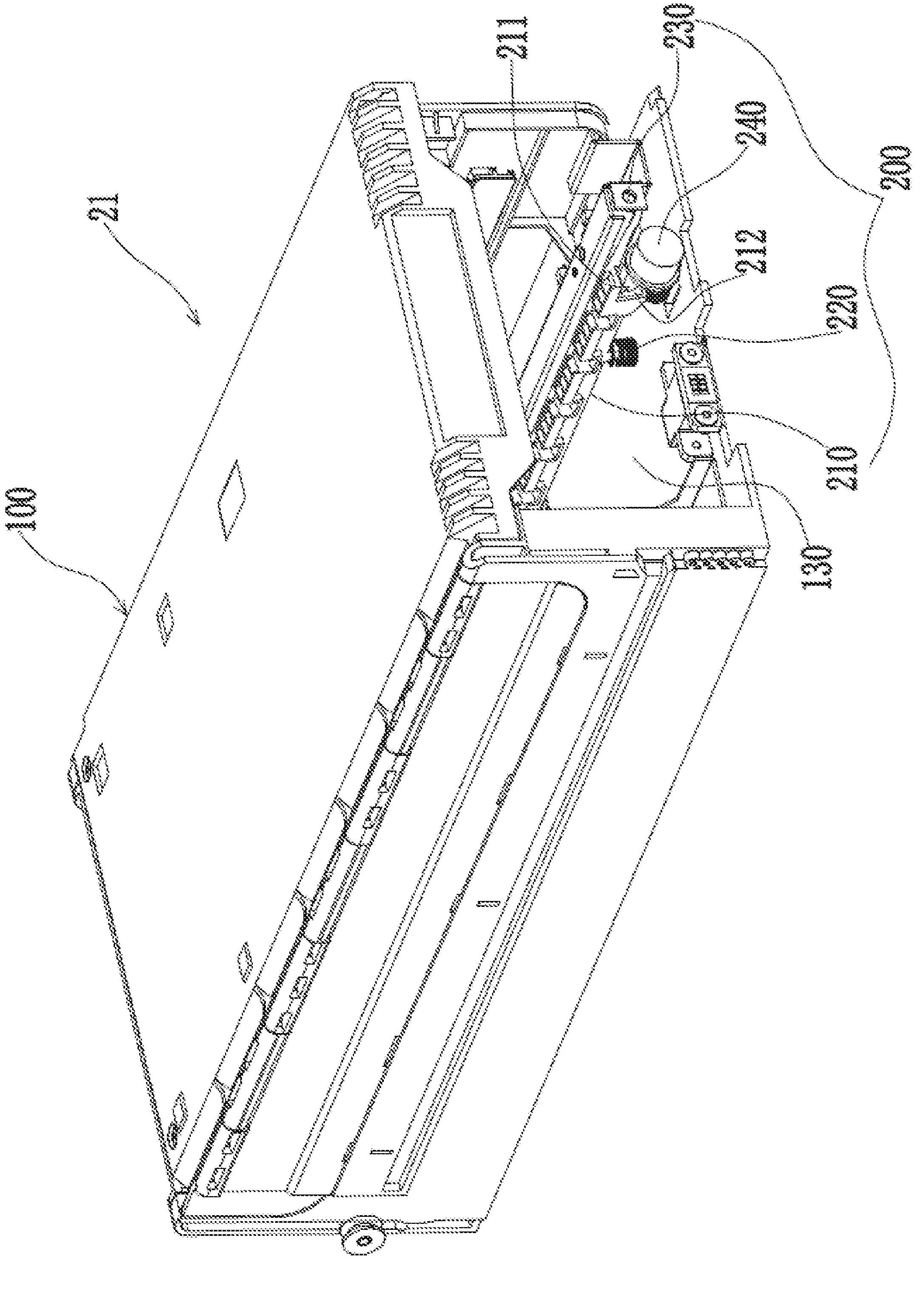
FIG. 3 is a schematic structural view of a cash box according to an embodiment, where a bottom plate and a datum plate are not shown provided by the present disclosure.

As shown in FIG. 1-FIG. 3, this embodiment provides a cash box 21. The cash box 21 includes a box body 100, a supporting plate 300 and a self-locking assembly 200, where the self-locking assembly 200 is configured to prevent the supporting plate 300 from moving in a banknotes stacking direction. In this embodiment, the self-locking assembly 200 includes a stop plate 210 disposed between a side wall 130 of the box body 100 and the supporting plate 300, the stop plate 210 being movably connected to the box body 100 and having a lifted position and a lowered position.

Figure 4:
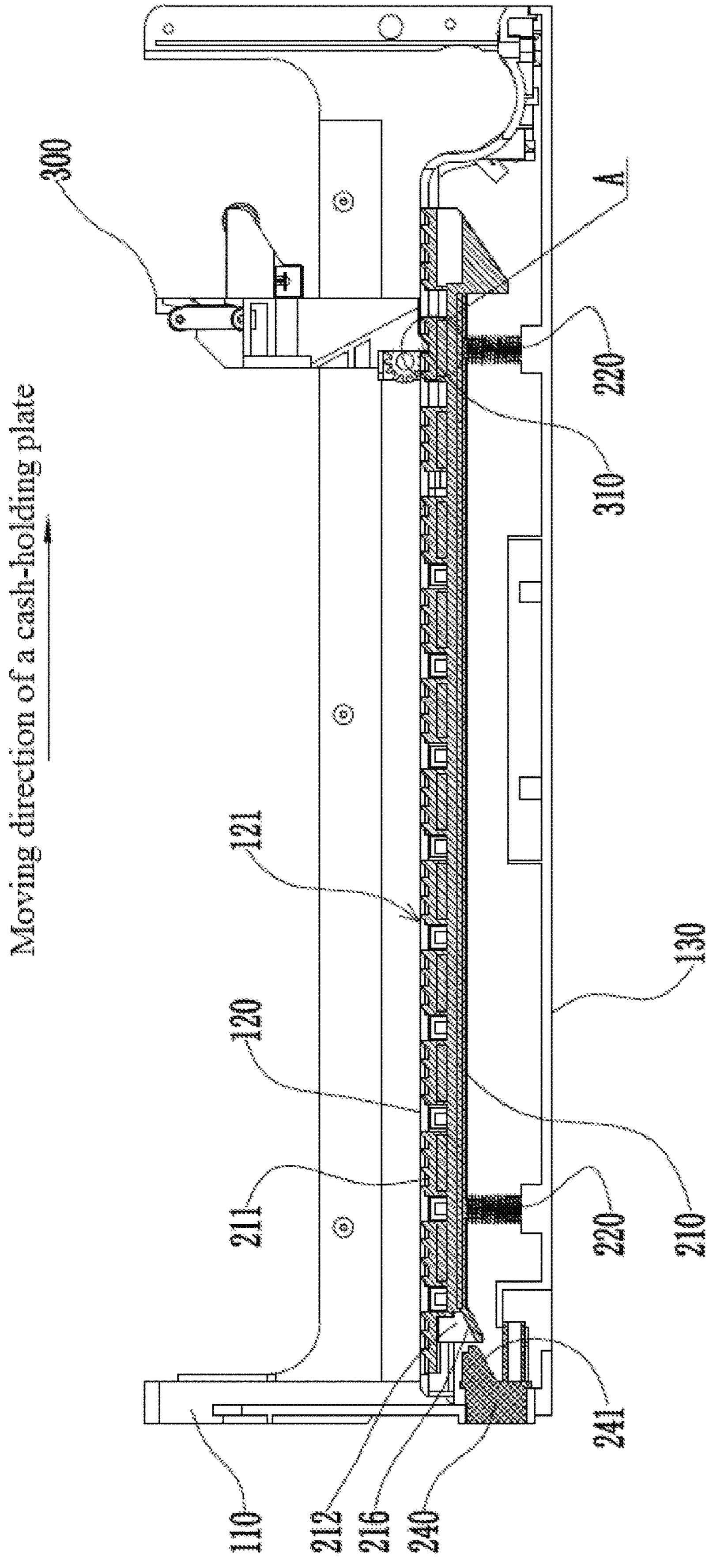
FIG. 4 is a sectional structural view of a cash box when a stop plate is in a lifted state according to an embodiment provided by the present disclosure.
Figure 6:
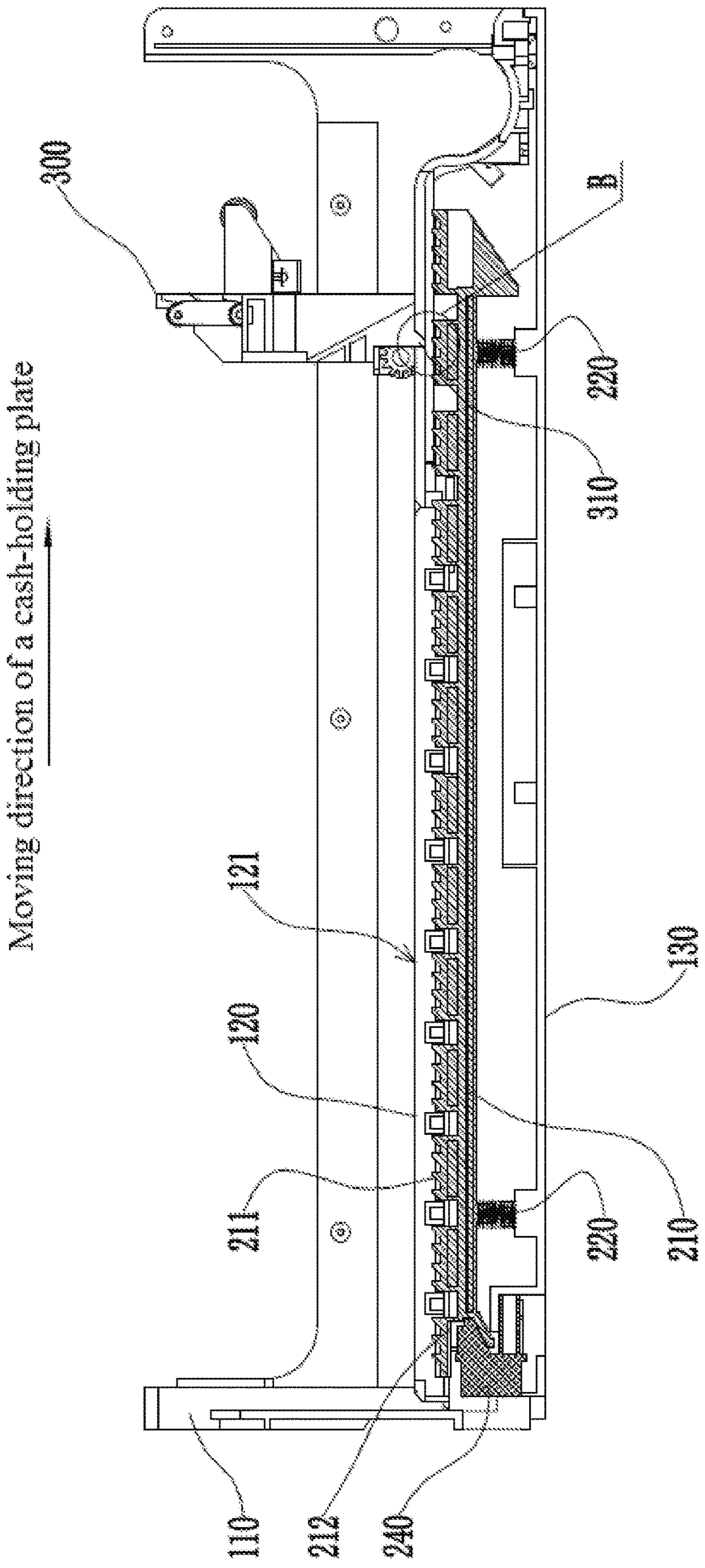
FIG. 6 is a sectional structural view of a cash box when a stop plate is in a pressed state according to an embodiment provided by the present disclosure.

In a case where the cash box 21 is transported, the stop plate 210 is in the lifted position (as shown in FIG. 4), and at this time, the stop plate 210 mates with the supporting plate 300 to lock the position of the supporting plate 300 so as to reduce or even avoid shaking of the supporting plate 300 caused by impact and vibration of the cash box 21; in a case where the cash box 21 is in a normal state for use, the stop plate 210 is in the lowered position (as shown in FIG. 6), and at this time, the stop plate 210 is separated from the supporting plate 300, and the position of the supporting plate 300 in the banknotes stacking direction is unlocked, so that the supporting plate 300 can move in the box body 100 in the banknotes stacking direction, and subsequent cash output and input can be completed.

The self-locking assembly 200 is arranged in the cash box 21, so that locking of the position of the supporting plate 300 in the banknotes stacking direction is achieved, the unfavorable situation of shaking of the supporting plate 300 caused by the impact or vibration is greatly improved, and then the supporting plate 300 can be stably in the locking position during a transportation process of the cash box 21, thus ensuring that banknotes are always orderly stacked on the supporting plate 300, and effectively improving the operational reliability of the cash box 21. In addition, the position locking principle of the self-locking assembly 200 is ingenious, and the solution is easy to achieve, which is of great significance for improving the operational reliability of the cash recycling and handling device.

With continued reference to FIG. 1-FIG. 3, in this embodiment, the box body 100 may be in the shape of a cuboid, and includes a top plate and a bottom plate 110 which are disposed opposite and spaced apart and four side walls 130 provided between the top plate and the bottom plate 110. In this embodiment, the separating assembly 400 is disposed adjacent to the top plate, the supporting plate 300 moves between the separating assembly 400 and the bottom plate 110, and the direction between the top plate and the bottom plate 110 is the banknotes stacking direction.

Figure 5:
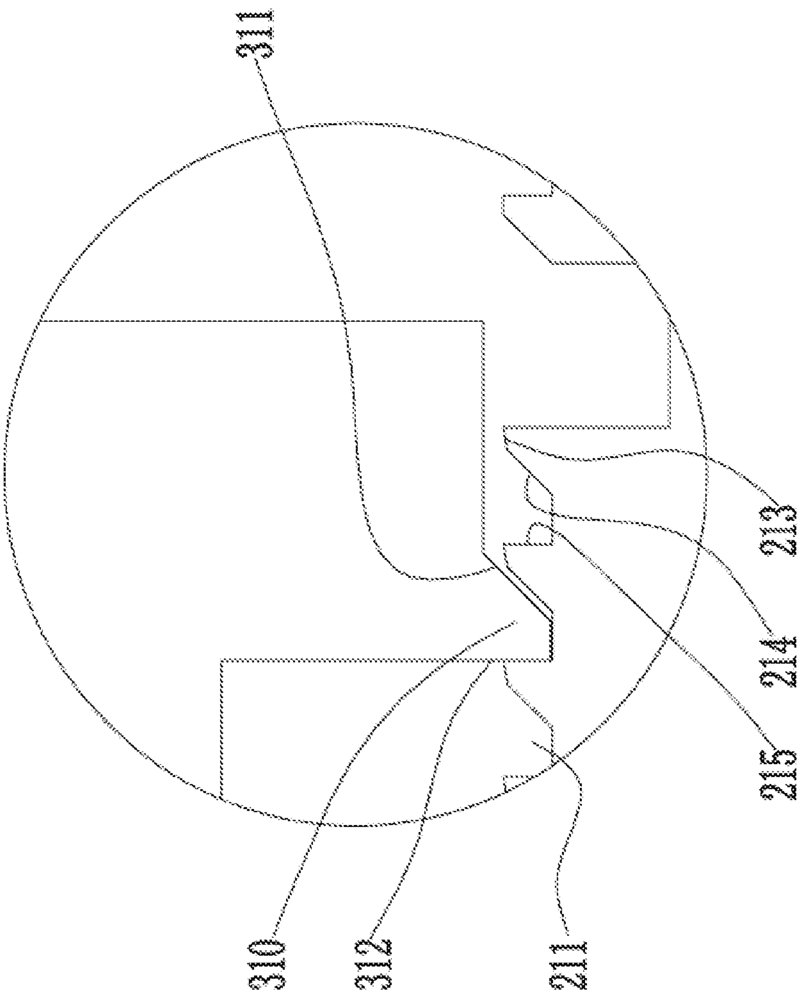
FIG. 5 is a partial enlarged view of part A of FIG. 4.
Figure 7:
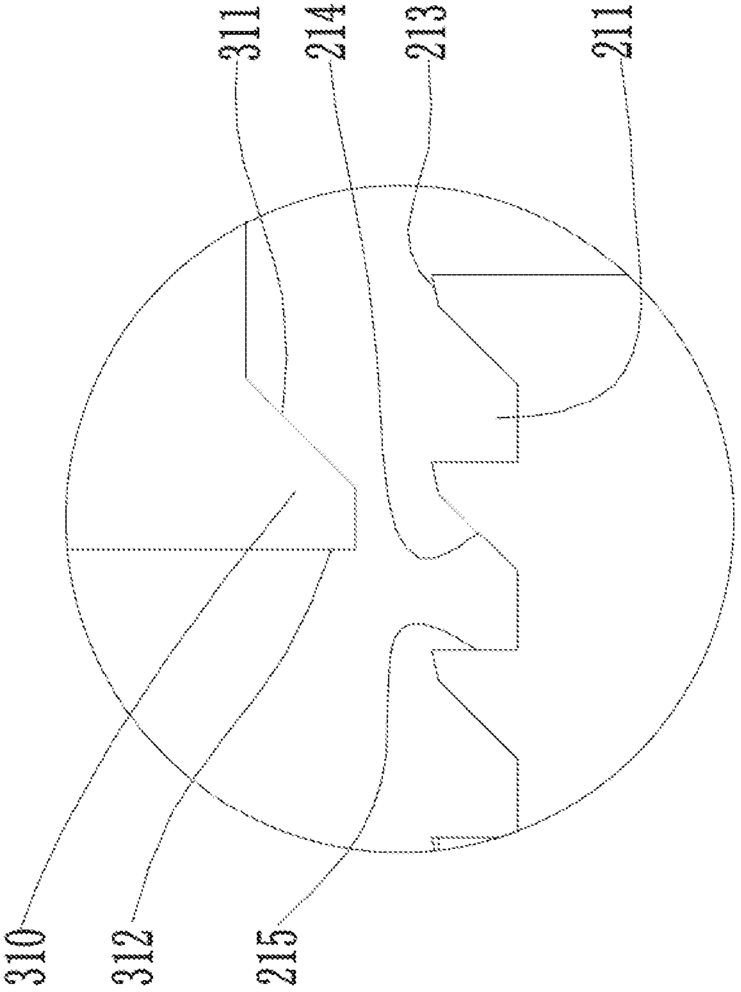
FIG. 7 is a partial enlarged view of part B of FIG. 6.

With continued reference to FIG. 4 and FIG. 6 and in combination with FIG. 5 and FIG. 7, in this embodiment, the side of the supporting plate 300 adjacent to the stop plate 210 is provided with an engaging part 310, and the stop plate 210 includes a plurality of recesses 211 which are spaced apart along the banknotes stacking direction and configured to be engaged with the engaging part 310 to limit the movement of the supporting plate 300 relative to the stop plate 210.

As shown in FIG. 5, in a case where the stop plate 210 is in the lifted position, the engaging part 310 is engaged into a recess 211, and the recess 211 is used to limit the movement of the engaging part 310 in the banknotes stacking direction, so as to lock of the position of the supporting plate 300; as shown in FIG. 7, in a case where the stop plate 210 is in the lowered position, the engaging part 310 is separated from the recess 211, and the supporting plate 300 is unlocked, so that the supporting plate 300 is in the state of being freely movable in the banknotes stacking direction.

In the form in which the engaging part 310 is engaged with the recess 211 to achieve locking and unlocking of the position of the supporting plate 300, the structure is simple and the cost is low. Moreover, with the plurality of recesses 211 disposed along the banknotes stacking direction, the locking of the supporting plate 300 in a plurality of positions is achieved, so that the nearest recess 211 can be selected to be engaged with the engaging part 310 to lock the position of the supporting plate 30 when the cash box 21 is being transported.

With continued reference to FIG. 1, FIG. 4 and FIG. 6, in this embodiment, the cash box 21 further includes a datum plate 120 fixedly disposed inside the box body 100; the supporting plate 300 can move along the surface of the datum plate 120; the stop plate 210 is located between the side wall 130 and the datum plate 120, and moreover, the datum plate 120 is provided with an opening 121 for exposing the recesses 211 on the stop plate 210.

In a case where the stop plate 210 is in the lifted position, the plurality of recesses 211 protrude out of the opening 121, and one of the plurality of recesses 211 is engaged with the engaging part 310 of the supporting plate 300; in a case where the stop plate 210 is in the lowered position, the plurality of recesses 211 is retracted from the opening 121 and separated from the engaging part 310 of the supporting plate 300.

With continued reference to FIG. 4-FIG. 7, in this embodiment, an elastic element is provided between the stop plate 210 and the side wall 130 and the elastic element is configured to enable the stop plate 210 to always have a tendency of moving towards the lifted position. The engaging part 310 includes a first blocking surface 312 perpendicular to the banknotes stacking direction and a first inclined surface 311 disposed adjacent to the banknote inlet and outlet of the cash box 21, and the first inclined surface 311 is disposed at an acute angle with the first blocking surface 312. Each of the recesses 211 includes a second inclined surface 214 in sliding fit with the first inclined surface 311 and a second blocking surface 215 abutting against the first blocking surface 312.

In the process of transporting the cash box 21, when the cash box 21 is subjected to impact or vibrates, and in a case where the direction of the impact or vibration force on the supporting plate 300 points to the direction away from the banknote inlet and outlet, the second blocking surface 215 prevents the first blocking surface 312 from moving and makes the movement freedom degree of the supporting plate 300 towards the bottom plate 110 reliably limited, thereby the position is locked reliably in the embodiment, ensuring the operational reliability of the cash box 21 and effectively preventing the shaking of the supporting plate 300 even in unfavorable situations such as accidental falling. In a case where the direction of the impact or vibration force on the supporting plate 300 points to the direction of the banknote inlet and outlet, the supporting plate 300 will move towards the top plate relative to the stop plate 210. At this time, with the sliding cooperation of the first inclined surface 311 and the second inclined surface 214, the stop plate 210 is pressed at first, and then under the elastic restoring force of the elastic element, the stop plate 210 is jacked up at the moment of the engaging part 310 being about to slide into the next recess 211, so that the engaging part 310 is completely engaged into the recess 211, locking the position of the supporting plate 300 in the banknotes stacking direction.

The structure form of one-way position locking of the engaging part 310 and the recess 211 achieves the position locking of the supporting plate 300 in the banknotes stacking direction and avoids the unfavorable situation that the supporting plate 300 moves in the direction away from the banknote inlet and outlet, so that banknotes can be always stacked on the supporting plate 300 orderly in the transportation process of the cash box 21. Moreover, because of such setting, under an acting force pointing to the banknote inlet and outlet, the supporting plate 300 can passively move for a certain distance towards the banknote inlet and outlet, and the position of the supporting plate 300 is locked by the next recess 211, so that the supporting plate 300 further compresses the banknotes, further ensuring the arrangement order degree of the banknotes and improving the operational reliability of the cash box 21 in this embodiment.

With continued reference to FIG. 4 and FIG. 6, the elastic element may include a plurality of springs 220 spaced apart along the banknotes stacking direction. In this embodiment, two springs 220 are provided. The spring 220 is wide in source and low in cost, so the implementation cost of the self-locking assembly 200 is reduced, and thereby the setting cost of the cash box 21 in this embodiment is reduced.

In this embodiment, a guide post may further be provided between the stop plate 210 and the side wall 130, the guide post being configured to guide the spring 220 and limit the position of the spring 220. In one embodiment, at each position where a spring 220 is disposed, a corresponding guide post is provided and the guide post extends between the stop plate 210 and the side wall 130, and the spring 220 is sleeved on the corresponding guide post. Such setting avoids the unfavorable situation of the spring 220 falling off between the stop plate 210 and the side wall 130, further ensuring the operational reliability of the cash box 21 of this embodiment.

With continued reference to FIG. 1 and FIG. 3, in this embodiment, the self-locking assembly 200 may further include an elastic button 240 configured to drive the stop plate 210 from the lifted position to the lowered position. In one embodiment, the elastic button 240 is movably disposed on the box body 100, and includes a wedge block extending towards the stop plate 210. As shown in FIG. 4, in one embodiment, the wedge block includes a third inclined surface 241, one side of the stop plate 210 adjacent to the elastic button 240, is provided with a retracting slot 212, and the retracting slot 212 includes a fourth inclined surface 216 in sliding fit with the third inclined surface 241.

In a case where the elastic button 240 is pressed, the wedge block inserts into the retracting slot 212, and at the same time, the third inclined surface 241 is in sliding fit with the fourth inclined surface 216. Since the elastic button 240 is fixed in the direction perpendicular to the side wall 130, the fourth inclined surface 216 moves towards the side wall 130 under the pushing action of the third inclined surface 241, thereby enabling the stop plate 210 to move from the lifted position to the lowered position and achieving unlocking of the position of the supporting plate 300.

In this embodiment, the elastic button 240 is movably provided on the bottom plate 110 of the box body 100.

In this embodiment, "elastic button 240" refers to a button elastically connected to the box body 100. For example, a connecting spring (not shown in the figures) is disposed between the button and the box body 100. In a case where the button is pressed, the connecting spring is compressed, so that the wedge block inserts into the retracting slot 212, and thus the stop plate 210 moves to the lowered position; in a case where the button is released, the wedge block withdraws from the retracting slot 212 under the elastic restoring force of the connecting spring, so the stop plate 210 is released, and the stop plate 210 moves to the lifted position under the action of the spring 220.

With continued reference to FIG. 5 and FIG. 7, in this embodiment, a guiding surface 213 is provided between the second inclined surface 214 of each recess 211 and the second blocking surface 215 of an adjacent recess 211, where the guiding surface 213 is connected to the second inclined surface 214 and extends inclined outward in an opening direction of the recess 211. Such design plays a good guiding role during the movement of the engaging part 310 to the next recess 211, so that the engaging part 310 can be smoothly engaged into the next recess 211.

With continued reference to FIG. 3, in this embodiment, the stop plate 210 may further include a connecting part 230. In this embodiment, the connecting part 230 is pivotally connected to the inner wall of the box body 100, and a pivot axis of the connecting part 230 is parallel to the banknotes stacking direction, where the stop plate 210 rotates between the lifted position and the lowered position around the pivot axis.

In one embodiment, the connecting part 230 may be a rotating shaft fixedly connected to the stop plate 210. The axis of the rotating shaft is parallel to the banknotes stacking direction, and the rotating shaft is pivotally connected to the side wall 130. In a case where the stop plate 210 moves in a direction perpendicular to the side wall 130, the rotating shaft rotates in the box body 100.

With continued reference to FIG. 2, in this embodiment, the cash box 21 may further include a supporting plate driving mechanism 500 configured to drive the supporting plate 300 to move in the banknotes stacking direction. In one embodiment, the supporting plate driving mechanism 500 includes a first pulley 510 and a second pulley which are pivotally connected in the box body 100, the first pulley 510 and the second pulley are spaced apart in the banknotes stacking direction, the first pulley 510 and the second pulley jointly support a belt 520 moving synchronously, the first pulley 510 is driven by a driving device to rotate, and the supporting plate 300 is fixedly connected to the belt 520.

The cash box 21 utilizes a belt transmission mechanism to achieve active movement of the supporting plate 300, and the supporting plate 300 is further in fit with the separating assembly 400 to achieve the storage and dispensing of banknotes.

Figure 8:
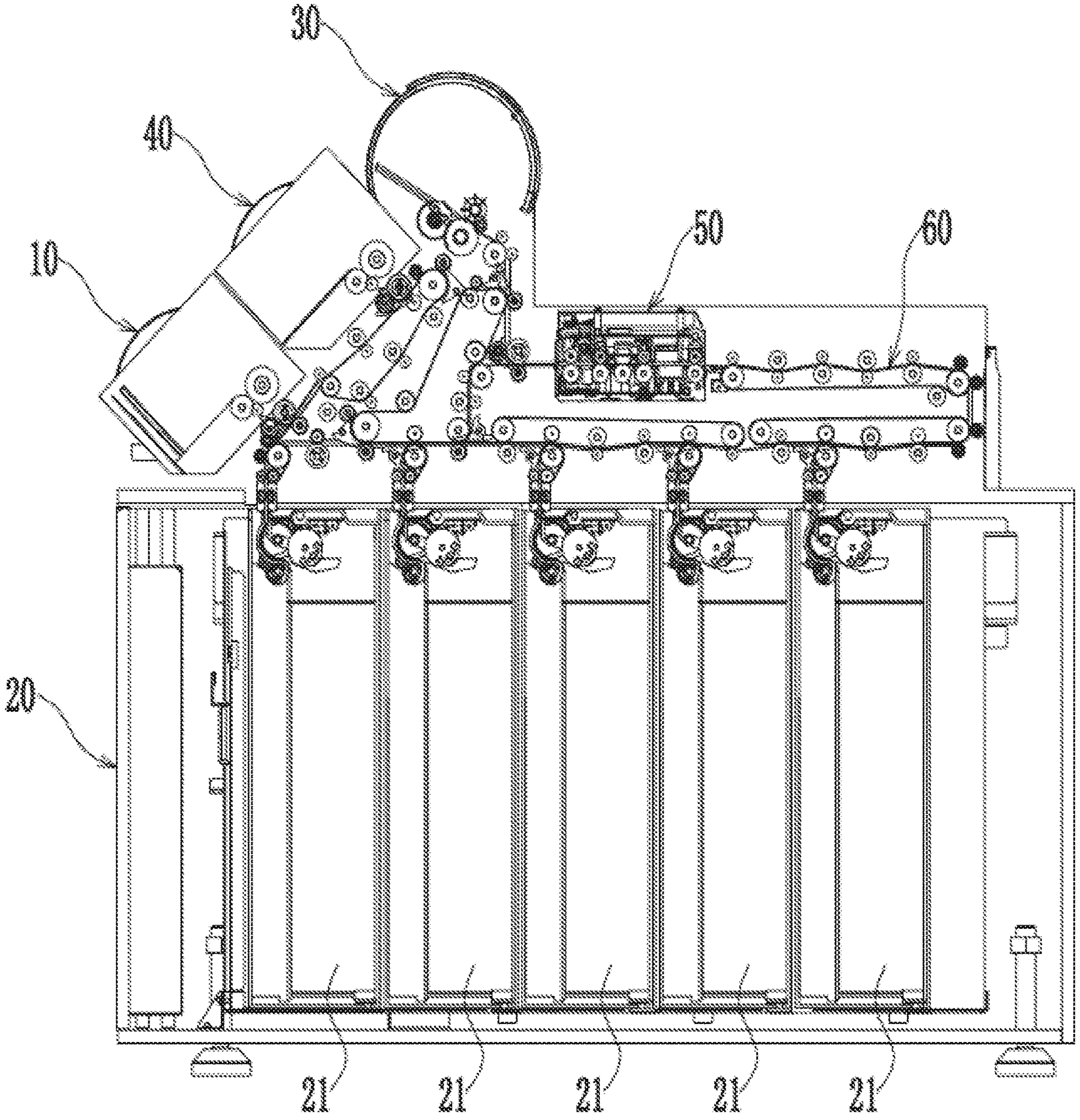
FIG. 8 is a schematic structural view of a cash recycling and handling device according to an embodiment provided by the present disclosure.

As shown in FIG. 8, a cash recycling and handling device may further be provided in this embodiment, and includes at least one above-mentioned cash box 21.

The above-mentioned cash box 21 is arranged in the cash recycling and handling device to achieve the storage and dispensing of banknotes, and the cash recycling and handling device accordingly has all the advantages of the above-mentioned cash box 21. The advantages are not repeated here.

Figure 9:
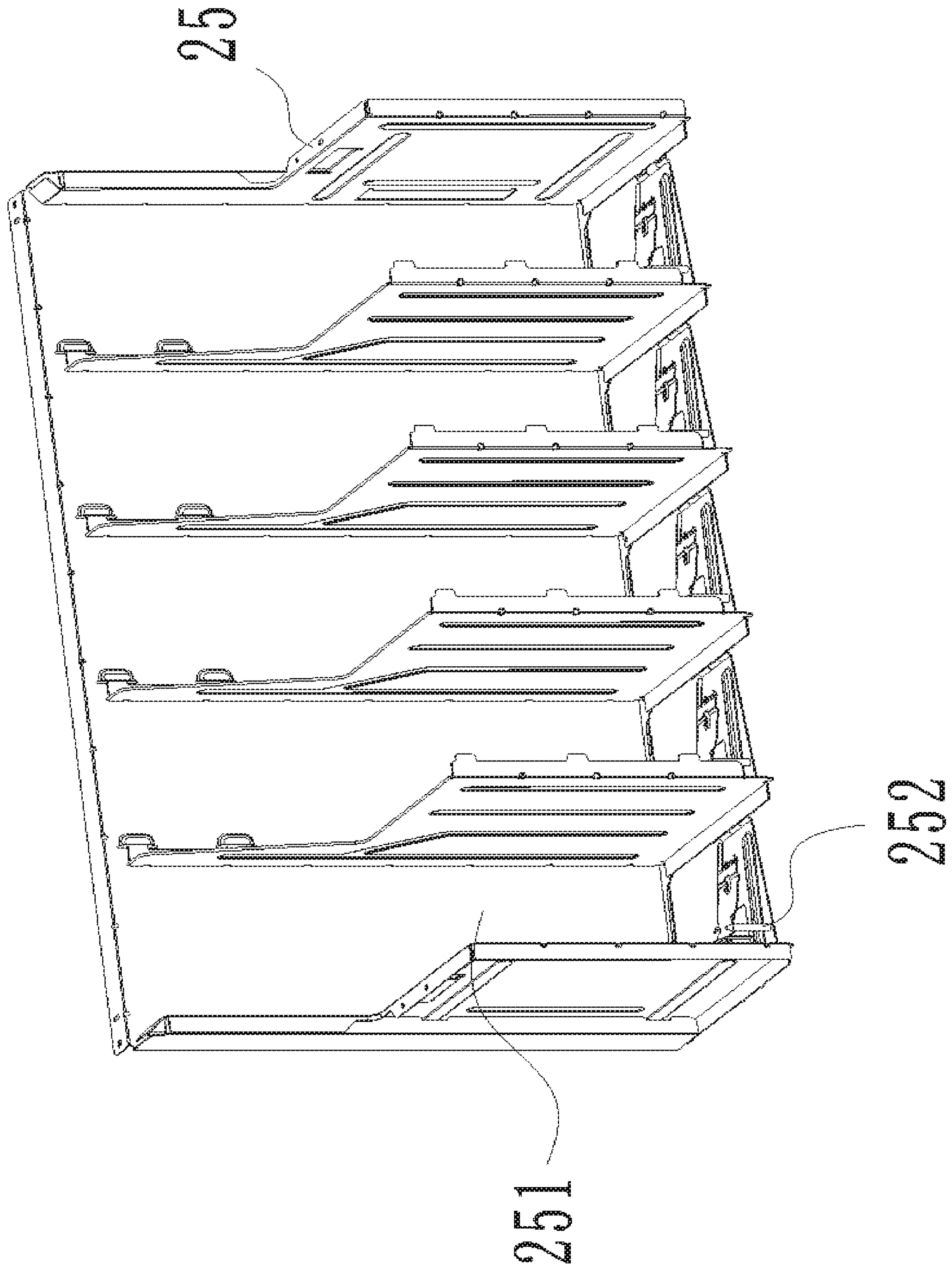
FIG. 9 is a schematic structural view of a frame of a cash recycling and handling device according to an embodiment provided by the present disclosure.

As shown in FIG. 9, in this embodiment, the cash recycling and handling device may further include a frame 25 arranged to install the cash box 21. The frame 25 is provided with an accommodating cavity 251 for accommodating the cash box 21, the number of accommodating cavities 251 is equal to the number of cash boxes 21, and the bottom wall of each accommodating cavity 251 is provided with a boss 252 cooperating with the elastic button 240 in the cash box 21. After the cash box 21 is installed in the frame 25, the elastic button 240 is pressed into the box body 100 by the boss 252, so that the stop plate 210 is in the lowered position, and at this time, the supporting plate 300 is in an unlocked state and can move freely along the banknotes stacking direction under the action of the supporting plate driving mechanism 500. In a case where the cash box 21 is removed from the frame 25, the elastic button 240 is separated from the boss 252, and the stop plate 210 moves to the lifted position under the action of the spring 220, so that the engaging part 310 is engaged into the recess 211, thereby preventing the movement of the supporting plate 300 towards the bottom plate 110 and locking the position of the supporting plate 300.

With continued reference to FIG. 8, in this embodiment, the cash recycling and handling device further includes a banknote input mechanism 30, a banknote output mechanism 40, a temporary storage mechanism 10, an identification mechanism 50, a safe 20, and a banknote conveying mechanism 60 connected between the various above-mentioned devices and the cash box 21, where a frame 25 arranged to install at least one cash box 21 is installed in the safe 20.

The basic operation process of the cash recycling and handling device is as follows: in a banknote input process, banknotes enter the banknote conveying mechanism 60 through the banknote input mechanism 30. After the banknotes are identified by the identification mechanism 50, banknotes meeting requirements enter at least one cash box 21 of the safe 20 to be stored, under the action of the banknote conveying mechanism 60, while the identified unacceptable banknotes are conveyed to a banknote collecting and separating device; in a banknote output process, banknotes enter the banknote conveying mechanism 60 from the cash box 21, and the banknotes meeting requirements are outputted from the banknote output mechanism 40 under the conveying action of the banknote conveying mechanism 60.

What is claimed is:

1. A cash box, comprising a box body, a supporting plate arranged in the box body, and a self-locking assembly configured to prevent the supporting plate from moving in a banknotes stacking direction;

wherein the self-locking assembly comprises a stop plate disposed between a side wall of the box body and the supporting plate, and the stop plate is movably connected to the box body and has a lifted position and a lowered position;

in a case where the stop plate is in the lifted position, the stop plate is in fit with the supporting plate to lock a position of the supporting plate; and in a case where the stop plate is in the lowered position, the stop plate is separated from the supporting plate to unlock the position of the supporting plate, wherein one side of the supporting plate adjacent to the stop plate is provided with an engaging part, and the stop plate comprises a plurality of recesses spaced apart in the banknotes stacking direction and configured to be engaged with the engaging part to limit the movement of the supporting plate relative to the stop plate.

2. The cash box according to claim 1, further comprising an elastic element, wherein the elastic element is disposed between the stop plate and the side wall and is configured to enable the stop plate to always have a tendency of moving towards the lifted position.

3. The cash box according to claim 2, wherein the self-locking assembly further comprises an elastic button configured to drive the stop plate to move from the lifted position to the lowered position, the elastic button is movably disposed on the box body and comprises a wedge block extending towards the stop plate, the wedge block comprises a third inclined surface, and one side of the stop plate adjacent to the elastic button is provided with a retracting slot, wherein the retracting slot comprises a fourth inclined surface in sliding fit with the third inclined surface; and in a case where the elastic button is pressed, the wedge block is inserts into the retracting slot, and the third inclined surface is in sliding fit with the fourth inclined surface, so that the stop plate is driven to move from the lifted position to the lowered position.

4. The cash box according to claim 1, wherein the engaging part comprises a first blocking surface and a first inclined surface, the first blocking surface is perpendicular to the banknotes stacking direction, the first inclined surface is disposed adjacent to a banknote inlet and outlet of the cash box, the first inclined surface is disposed at an acute angle with the first blocking surface, and each recess comprises a second inclined surface in sliding fit with the first inclined surface and a second blocking surface abutting against the first blocking surface.

5. The cash box according to claim 4, wherein a guiding surface is provided between the second inclined surface of the each of the plurality of recesses and a second blocking surface of an adjacent recess, and the guiding surface is connected to the second inclined surface, extends inclined outward in an opening direction of the recess.

6. The cash box according to claim 5, wherein the stop plate further comprises a connecting part, wherein the connecting part is pivotally connected to an inner wall of the box body, a pivot axis of the connecting part is parallel to the banknotes stacking direction, and the stop plate is rotatable between the lifted position and the lowered position about the pivot axis of the connecting part.

7. The cash box according to claim 4, wherein the self-locking assembly further comprises an elastic button configured to drive the stop plate to move from the lifted position to the lowered position, the elastic button is movably disposed on the box body and comprises a wedge block extending towards the stop plate, the wedge block comprises a third inclined surface, and one side of the stop plate adjacent to the elastic button is provided with a retracting slot, wherein the retracting slot comprises a fourth inclined surface in sliding fit with the third inclined surface; and in a case where the elastic button is pressed, the wedge block is inserts into the retracting slot, and the third inclined surface is in sliding fit with the fourth inclined surface, so that the stop plate is driven to move from the lifted position to the lowered position.

8. The cash box according to claim 4, wherein the stop plate further comprises a connecting part, wherein the connecting part is pivotally connected to an inner wall of the box body, a pivot axis of the connecting part is parallel to the banknotes stacking direction, and the stop plate is rotatable between the lifted position and the lowered position about the pivot axis of the connecting part.

9. The cash box according to claim 1, wherein the self-locking assembly further comprises an elastic button configured to drive the stop plate to move from the lifted position to the lowered position, the elastic button is movably disposed on the box body and comprises a wedge block extending towards the stop plate, the wedge block comprises a third inclined surface, and one side of the stop plate adjacent to the elastic button is provided with a retracting slot, wherein the retracting slot comprises a fourth inclined surface in sliding fit with the third inclined surface; and in a case where the elastic button is pressed, the wedge block is inserts into the retracting slot, and the third inclined surface is in sliding fit with the fourth inclined surface, so that the stop plate is driven to move from the lifted position to the lowered position.

10. The cash box according to claim 1, wherein the stop plate further comprises a connecting part, wherein the connecting part is pivotally connected to an inner wall of the box body, a pivot axis of the connecting part is parallel to the banknotes stacking direction, and the stop plate is rotatable between the lifted position and the lowered position about the pivot axis of the connecting part.

11. The cash box according to claim 10, further comprising a datum plate fixedly disposed inside the box body, wherein the datum plate is provided with an opening, and in a case where the stop plate is in the lifted position, the plurality of recesses protrude out of the opening and one of the plurality of recesses is engaged with the engaging part of the supporting plate, and in a case where the stop plate is in the lowered position, the plurality of recesses are retracted from the opening and separated from the engaging part of the supporting plate.

12. The cash box according to claim 1, wherein the self-locking assembly further comprises an elastic button configured to drive the stop plate to move from the lifted position to the lowered position, the elastic button is movably disposed on the box body and comprises a wedge block extending towards the stop plate, the wedge block comprises a third inclined surface, and one side of the stop plate adjacent to the elastic button is provided with a retracting slot, wherein the retracting slot comprises a fourth inclined surface in sliding fit with the third inclined surface; and in a case where the elastic button is pressed, the wedge block is inserts into the retracting slot, and the third inclined surface is in sliding fit with the fourth inclined surface, so that the stop plate is driven to move from the lifted position to the lowered position.

13. A cash recycling and handling device, comprising at least one cash box, wherein each cash box comprises a box body, a supporting plate arranged in the box body, and a self-locking assembly configured to prevent the supporting plate from moving in a banknotes stacking direction;

wherein the self-locking assembly comprises a stop plate disposed between a side wall of the box body and the supporting plate, and the stop plate is movably connected to the box body and has a lifted position and a lowered position;

in a case where the stop plate is in the lifted position, the stop plate is in fit with the supporting plate to lock a position of the supporting plate; and in a case where the stop plate is in the lowered position, the stop plate is separated from the supporting plate to unlock the position of the supporting plate;

wherein one side of the supporting plate adjacent to the stop plate is provided with an engaging part, and the stop plate comprises a plurality of recesses spaced apart in the banknotes stacking direction and configured to be engaged with the engaging part to limit the movement of the supporting plate relative to the stop plate.

14. The cash recycling and handling device according to claim 13, further comprising a frame configured for installing the cash box, wherein the frame is provided with a boss cooperating with an elastic button in the cash box, and in a case where the cash box is installed in the frame, the elastic button is pressed into the box body by the boss so that the stop plate is in the lowered position.

15. The cash recycling and handling device according to claim 13, wherein the each cash box further comprises an elastic element, wherein the elastic element is disposed between the stop plate and the side wall and is configured to enable the stop plate to always have a tendency of moving towards the lifted position.

16. The cash recycling and handling device according to claim 13, wherein the engaging part comprises a first blocking surface and a first inclined surface, the first blocking surface is perpendicular to the banknotes stacking direction, the first inclined surface is disposed adjacent to a banknote inlet and outlet of the cash box, the first inclined surface is disposed at an acute angle with the first blocking surface, and each recess comprises a second inclined surface in sliding fit with the first inclined surface and a second blocking surface abutting against the first blocking surface.

17. The cash recycling and handling device according to claim 13, wherein the self-locking assembly further comprises an elastic button configured to drive the stop plate to move from the lifted position to the lowered position, the elastic button is movably disposed on the box body and comprises a wedge block extending towards the stop plate, the wedge block comprises a third inclined surface, and one side of the stop plate adjacent to the elastic button is provided with a retracting slot, wherein the retracting slot comprises a fourth inclined surface in sliding fit with the third inclined surface; and in a case where the elastic button is pressed, the wedge block is inserts into the retracting slot, and the third inclined surface is in sliding fit with the fourth inclined surface, so that the stop plate is driven to move from the lifted position to the lowered position.

* * * * *